June 26, 1928.
D. H. NASH
1,674,915
SAFETY BRAKE FOR MOTOR DRIVEN VEHICLES
Filed July 14, 1927
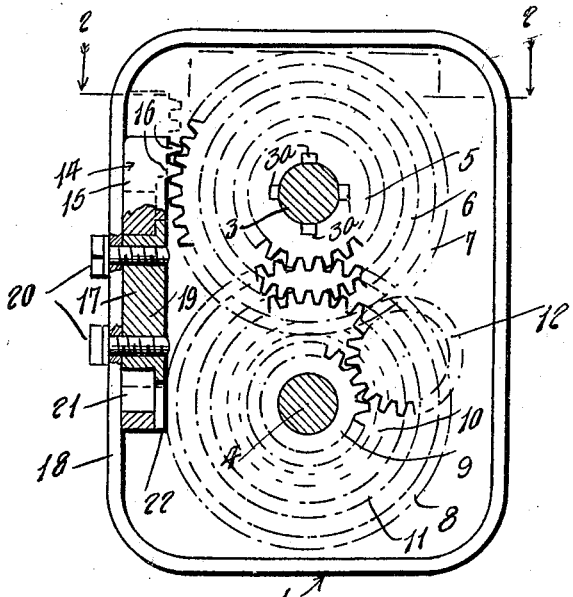
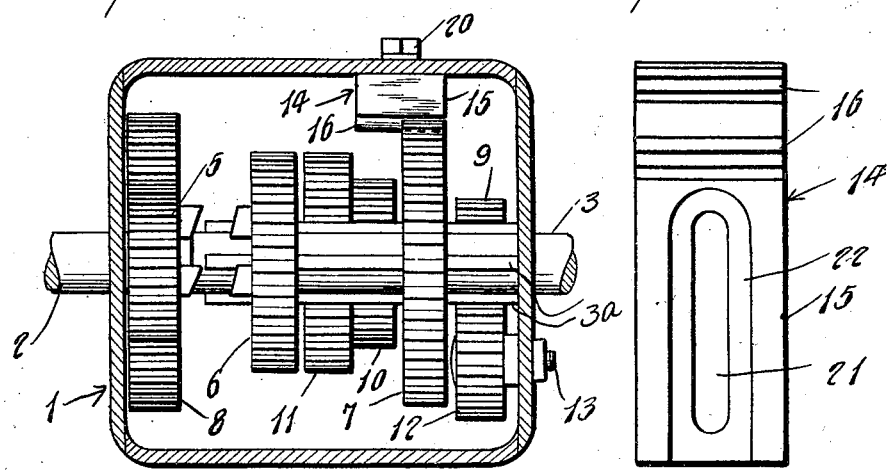
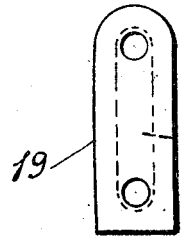
INVENTOR.
D. H. Nash
BY
ATTORNEY.

Patented June 26, 1928.

1,674,915

UNITED STATES PATENT OFFICE.

DAVID H. NASH, OF PETERSBURG, VIRGINIA.

SAFETY BRAKE FOR MOTOR-DRIVEN VEHICLES.

Application filed July 14, 1927. Serial No. 205,694.

This invention relates to a safety brake for an automobile, and has for one of its objects to provide a device of this character which shall be adapted to cooperate directly with one of the gears of the transmission mechanism of the automobile for the purpose of automatically locking the automobile against backward movement should it accidentally stop or be intentionally stopped on an incline.

A further object of the invention is to provide a device of the character stated which shall consist of comparatively few parts, which shall be adapted to be easily and quickly secured in operative position with respect to a gear of the transmission mechanism, and which shall be strong, durable and highly efficient.

With the foregoing and other object in view, the nature of which will become apparent as the description proceeds, the invention consists of the construction, combination and arrangement of parts hereinafter fully described and claimed, and illustrated in the accompanying drawing, wherein:

Figure 1 is a sectional view taken on a plane extending vertically and transversely through a transmission gearing equipped with a safety brake constructed in accordance with my invention, Figure 2 is a sectional view taken on the horizontal plane indicated by the line 2—2 of Figure 1, Figure 3 is a detail elevational view of the safety brake, and Figure 4 is a similar view of the member for securing the safety brake in applied position.

Referring in detail to the drawing 1 designates the casing, 2 the clutch shaft, 3 the sliding gear shaft and 4 the counter shaft of an automobile transmission mechanism. The sliding gear shaft 3 is connected to the propeller shaft of the automobile by a universal joint, not shown. A high speed and clutch gear 5 is carried by the clutch shaft 2. An intermediate and clutch gear 6 and a low speed and reverse gear 7 are slidably connected to the sliding gear shaft 3 by ribs 3ª. The counter shaft 4 carries a drive gear 8, a reverse pinion 9, a low speed pinion 10 and an intermediate speed pinion 11. A reverse idle gear 12 meshing with the reverse pinion 9, is journaled on a stub shaft 13 carried by the casing 1. During the forward propulsion of the automobile, the sliding gear shaft 3 and the low speed and reverse gear 7 rotate in a clockwise direction when viewed from the front, while during the rearward or reverse propulsion of the automobile, these parts rotate in the reverse or counter-clockwise direction. As the transmission mechanism is of well known construction a further description thereof and the illustration of the means for shifting the gears 6 and 7 are deemed unnecessary.

The device forming the subject-matter of this invention, comprises a detent 14 which is supported for limited sliding movement in a vertical direction at the right hand side of the low speed and reverse gear 7. The detent 14 consists of an elongated and vertically arranged body 15 and elongated and horizontally arranged cogs or teeth 16 which latter are positioned at the upper end of the former and associated with the gear 7 so as to prevent any backward rotation of the gear when it is in neutral position or in active position in engagement with the pinion 10. The teeth 16 are long enough to permit the gear 7 to be shifted from one of said positions to the other without effecting the operative relation of the gear and the detent 14. This operative relation is, however, destroyed when the gear 7 is shifted into engagement with the reverse idle gear 12, and when the gear is in this position it is situated rearwardly beyond the detent 14.

The detent 14 is slidably supported and guided in its movements by an elongated block 17 which is secured in a vertical position against the inner surface of the lateral wall 18 of the casing 1, and is maintained on the block by this wall and by a flange 19 which extends beyond the ends and the front and rear sides of the block. The block 17 is secured in place by cap screws 20 or in any other suitable manner. The detent 14 is provided with a vertical slot 21 which is longer than and provided for the reception of the block 17, and it is provided in its inner side with a recess 22 for the reception of the flange 19 of the block.

In practice, the detent 14 is adapted to occupy an active or an inactive position, and it is automatically moved from one of these positions to the other by the gear 7. The detent 14 is shown in active position by solid lines and in inactive position by dotted lines in Figure 1. When in active position, the detent 14 rests upon the block 17 and engages the gear 7 above the horizontal axis of the gear, and it holds the gear against backward rotation. When in inactive position, the detent 14 is in raised position with respect to the block 17 and out of engagement with the gear 7, and it permits the free and unobstructed forward rotation of the gear. While the automobile is in forward motion, the gear 7 supports the detent 14 in inactive position. The resultant intermittent contact between the gear 7 and detent 14 is rendered noiseless, and the wear on these parts as the result of such contact is reduced to the minimum, by the heavy lubricant in the casing 1. Should the automobile accidentally stop or be intentionally stopped on an incline, it will be held against forward movement down the incline by and as the result of the movement of the detent 14 into active position by the gear 7. As the gear 7 is, when in engagement with the pinion 12, out of operative relation with respect to the detent 14, the detent will not interfere with the backward propulsion of the automobile.

It should be understood that the drawing is merely illustrative and does not pretend to give exact proportions. Furthermore, the said drawing is illustrative of a preferred construction, it being my expectation that various changes and modifications may be made without departing from the spirit and scope of my invention.

What is claimed is:—

1. In combination, a transmission mechanism having a shiftable gear adapted to occupy a neutral and a forward driving position, a detent, and means supporting the detent for engagement by the gear on the backward movement thereof when in either of said positions.

2. In combination, a transmission mechanism having a shiftable gear adapted to occupy a neutral position, a forward driving position and a rearward driving position, a detent, and means supporting the detent for engagement by the gear on the backward rotation thereof when in either neutral or forward driving position.

3. In combination, a transmission mechanism having a shiftable gear, a detent, and means slidably supporting the detent at a lateral side of the gear.

4. In combination, a transmission mechanism having a shiftable gear, a detent having teeth longer than those of the gear, and means supporting the detent for engagement by the gear on the backward rotation thereof.

5. In combination, a transmission mechanism having a casing and shiftable gear, a block secured to the casing and located within the same, and a detent having a slot longer than and provided for the reception of the block, the detent being adapted to be engaged by the gear on the backward rotation thereof.

6. In combination, a transmission mechanism having a casing and a shiftable gear, a block secured to the casing and located within the same and provided with a flange, and a detent provided with a slot for the reception of the block and a recess for the reception of the flange, the detent being slidably supported by the block and adapted to be engaged by the gear on the backward rotation thereof.

7. In combination, a gear of a transmission mechanism, a detent, and means supporting the detent in operative relation to the gear, the detent being movable on said means to permit it to be moved into active position by the gear when the gear turns in one direction and to permit it to be moved into inactive position by the gear when the gear turns in the opposite direction.

In testimony whereof I affix my signature.

DAVID H. NASH.